(12) United States Patent
Park et al.

(10) Patent No.: US 7,390,285 B2
(45) Date of Patent: Jun. 24, 2008

(54) HYDRAULIC CONTROL SYSTEM OF AUTOMATIC TRANSMISSION FOR VEHICLE

(75) Inventors: Jong Sool Park, Suwon (KR); Hyeog June Lee, Yongin (KR); Jin Mo Park, Gwacheon (KR); Byung Kwan Shin, Suwon (KR)

(73) Assignee: Hyundai Motor Company, Seoul (KR)

( * ) Notice: Subject to any disclaimer, the term of this patent is extended or adjusted under 35 U.S.C. 154(b) by 267 days.

(21) Appl. No.: 11/264,853

(22) Filed: Nov. 2, 2005

(65) Prior Publication Data

US 2006/0105882 A1 May 18, 2006

(30) Foreign Application Priority Data

Nov. 2, 2004 (KR) .................. 10-2004-0088254

(51) Int. Cl.
*F16H 61/26* (2006.01)
*F16H 61/04* (2006.01)
*F16H 31/00* (2006.01)

(52) U.S. Cl. .................... 477/127; 477/143; 475/128
(58) Field of Classification Search ................ 475/116, 475/120, 121, 127, 128; 477/127, 130, 131, 477/143, 147, 149; 137/825, 84–86
See application file for complete search history.

(56) References Cited

U.S. PATENT DOCUMENTS

| 5,005,444 A * | 4/1991 | Kimura et al. ............. 477/117 |
| 6,027,427 A * | 2/2000 | Yoo ........................... 477/130 |
| 6,832,976 B2 * | 12/2004 | Nishida et al. ............. 477/120 |
| 2004/0067810 A1 * | 4/2004 | Fujimine et al. ............ 475/127 |

* cited by examiner

*Primary Examiner*—Roger Pang
(74) *Attorney, Agent, or Firm*—Morgan Lewis & Bockius LLP

(57) ABSTRACT

A hydraulic control system of an automatic transmission that precisely control is operating hydraulic pressure supplied to a frictional element during shifting and can eliminate oil leak under a maximum operating hydraulic pressure. The hydraulic control system controls a hydraulic pressure generated by a hydraulic pump to from an operating hydraulic pressure for a frictional element selectively operating at each shift ratio. A hydraulic line is configured such that the operating hydraulic pressure of the frictional element is controlled by a pressure control valve and a switching valve that are controlled by a solenoid valve. An exhaust hydraulic line of the pressure control valve is connected to an exhaust hydraulic line of the switching valve such that the exhaust hydraulic line of the pressure control valve can be controlled by a switching of the switching valve.

15 Claims, 5 Drawing Sheets

US 7,390,285 B2

HYDRAULIC CONTROL SYSTEM OF AUTOMATIC TRANSMISSION FOR VEHICLE

CROSS-REFERENCE TO RELATED APPLICATION

This application claims priority to and the benefit of Korean Patent Application No. 10-2004-0088254 filed in the Korean Intellectual Property Office on Nov. 2, 2004, the entire contents of which are incorporated herein by reference.

BACKGROUND OF THE INVENTION (a) Field of the Invention

The present invention relates to a hydraulic control system of an automatic transmission for vehicles. More particularly, the present invention relates to a hydraulic control system of an automatic transmission capable of more precise control of the operating hydraulic pressure supplied to frictional elements.

(b) Description of the Related Art

In an automatic transmission, a TCU (transmission control unit) controls a plurality of solenoid valves of a hydraulic control system based on various conditions, such as vehicle speed and opening of a throttle valve, so as to control the operating pressure supplied to a plurality of frictional elements (e.g. clutch and brake) that are applied to a gear train and selectively operate at a target shift ratio, and thereby automatically achieving a specific shift ratio. In such an automatic transmission, a clutch consisting of frictional elements must be supplied with a maximum hydraulic pressure corresponding to a torque load for a corresponding clutch under which slip can be prevented at a maximum input torque for each shift ratio. A precise hydraulic pressure control should be performed within a suitable range in order to achieve a smooth shift feel while performing an operating control or releasing control of a clutch.

In addition, the hydraulic pressure control range during shifting may be lower than a maximum pressure designed considering stall torque ratio of the torque converter. The minimum pressure may be 0 or a specific value for pre-fill characteristics. A pre-fill value of the minimum pressure may be realized by a pressure control valve or a regulating ball connected to an exhaust port of a hydraulic pressure control valve.

Thus, since the hydraulic pressure control range during shifting is relatively shorter compared to a range of the maximum pressure and the minimum pressure, the control range of the control pressure of a solenoid valve is limited. Also, the sensitivity of the clutch control pressure with respect to the change of a solenoid valve control pressure is reduced. Therefore, a difference in shift feel becomes great depending on the deviation of the control pressure of a solenoid valve.

In particular, in the case where there is a great difference in torque load between shift ratios in a multi-stage transmission, such as a six-speed transmission, there can be a problem in that the hydraulic pressure control range during shifting is very restrictively set as 20 to 30% of a maximum pressure. In order to solve such a problem, in the conventional control of operating pressure supplied to a frictional element, if a shift signal is generated by a TCU, a solenoid valve controls a solenoid supply pressure and supplies the controlled pressure to a pressure control valve. For such a control, the force from the maximum control pressure of the solenoid valve is set to be greater than the sum of the force of a maximum control pressure of a clutch and a spring elastic force.

However, in a case of controlling hydraulic pressure supplied to a frictional element, since an operating hydraulic pressure of the frictional element is controlled by a pressure control valve, having a narrow control pressure range, there can be a problem in that a precise hydraulic pressure control is difficult. In addition, since the solenoid valve control pressure directly controls the pressure control valve, a change of operating hydraulic pressure of a frictional element depending on control pressure deviation is relatively great. Accordingly, precise hydraulic pressure control is further complicated, and may not be possible. Also, in the case where there is a great difference in torque load between shift ratios in a multi-stage transmission, such as a six-speed transmission, the control range of a solenoid valve becomes narrow, so that a precise hydraulic pressure control is rendered even more difficult.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiment of the present invention to provide a hydraulic control system of an automatic transmission having advantages of being able to perform a precise control by increasing a control pressure range of a solenoid valve for controlling an operating hydraulic pressure supplied to a frictional element during shifting and by decreasing a change of an operating hydraulic pressure of a frictional element due to a deviation of a solenoid valve control pressure. In addition embodiment of, the present invention provide a hydraulic control system of an automatic transmission having advantages of being able to design a control range of a solenoid valve suitable for shifting capacity in the case that a change of torque load between shift ratios is great and solving an oil leak problem under a maximum pressure.

In an exemplary hydraulic control system of an automatic transmission for a vehicle according to an embodiment of the present invention, in which hydraulic pressure is generated by a hydraulic pump and delivered at an operating hydraulic pressure for a frictional element to selectively operate at each shift ratio, a hydraulic line is configured such that the operating hydraulic pressure of the frictional element is controlled by a pressure control valve and a switching valve that are controlled by a solenoid valve, and an exhaust hydraulic line of the pressure control valve is connected to an exhaust hydraulic line of the switching valve such that the exhaust hydraulic line of the pressure control valve can be controlled by a switching of the switching valve.

The exhaust hydraulic line of the pressure control valve may be configured to be opened/closed by a switching of the switching valve.

The exhaust hydraulic line of the pressure control valve may be configured to be supplied with a line pressure by a switching of the switching valve.

The switching valve may be configured to be controlled by a solenoid supply pressure and a solenoid control pressure.

The switching valve may be configured to be controlled by the solenoid supply pressure, the solenoid control pressure, and an elastic force of an elastic member.

The pressure control valve may be configured to be controlled by the solenoid control pressure and an operating pressure of the frictional element.

The pressure control valve may be configured to be controlled by a solenoid control pressure, an operating hydraulic pressure of the frictional element, and an elastic force of an elastic member.

The pressure control valve may be configured to be controlled by the solenoid control pressure, the operating hydraulic pressure of the frictional element, and the solenoid supply pressure.

The pressure control valve may be configured to be controlled by the solenoid control pressure, the operating hydraulic pressure of the frictional element, and solenoid supply pressure, and an elastic force of the elastic member.

In another exemplary embodiment of the present invention, a hydraulic control system of an automatic transmission for a vehicle that controls a hydraulic pressure generated by a hydraulic pump to an operating hydraulic pressure for a frictional element selectively operating at each shift ratio and supplies the operating hydraulic pressure includes a pressure control valve controlling a line pressure by being controlled by a solenoid valve and supplying the controlled pressure to a frictional element, and a switching valve controlling an exhaust hydraulic line of the pressure control valve by being controlled by the solenoid valve.

The pressure control valve may be formed as a spool valve and may be configured to be controlled by a control pressure of the solenoid valve, an operating pressure of the frictional element, and an elastic force of an elastic member.

The pressure control valve may include a valve body, a valve spool, and an elastic member, wherein the valve body includes a first port through which the control pressure of the solenoid valve is supplied, a second port through which the line pressure is supplied, a third port supplying the hydraulic pressure supplied through the second port to the frictional element, a fourth port supplied with a portion of the hydraulic pressure discharged through the third port, and a fifth port communicating with an exhaust hydraulic line exhausting an exhaust pressure of the third port to the switching valve, the valve spool includes a first land on which the control pressure supplied through the first port acts, and a second land on which the hydraulic pressure supplied through the fourth port acts and which selectively opens/closes the second port, and the elastic member is disposed between the second land and the valve body.

The switching valve may be formed as a spool valve and may be configured to be controlled by a solenoid supply pressure, a solenoid control pressure, and an elastic force of an elastic member.

The switching valve may include a valve body, a valve spool, and an elastic member, wherein the valve body includes a first port through which a solenoid supply pressure is supplied, a second port through which a control pressure of the solenoid valve is supplied, a third port connected to an exhaust hydraulic line of the pressure control valve, and a fourth port selectively communicated with the third port to act as an exhaust port, the valve spool includes a first land on which an hydraulic pressure supplied through the first port acts, and a second land on which a hydraulic pressure supplied through the second port acts and which selectively opens/closes the fourth port, and the elastic member is disposed between the second land and the valve body.

The switching valve may be formed as a spool valve and may be configured to be controlled by a solenoid supply pressure, a solenoid control pressure, an operating hydraulic pressure of the frictional element, and an elastic force of an elastic member.

In still another exemplary embodiment of the present invention, a hydraulic control system of an automatic transmission of a vehicle includes a valve body, a valve spool, and an elastic member, wherein the valve body includes a first port through which a solenoid supply pressure is supplied, a second port through which a control pressure of a solenoid valve is supplied, a third port through which an operating hydraulic pressure of a frictional element is supplied, a fourth port connected to an exhaust hydraulic line of a pressure control valve, and a fifth port selectively communicating with the fourth port thereby acting as an exhaust port, the valve spool includes a first land on which the hydraulic pressure supplied through the first port acts, a second land selectively opening/closing the fourth port and the fifth port, and a third land on which the hydraulic pressure supplied through the second port acts, and the elastic member is disposed between the third land and the valve body.

DESCRIPTION OF THE EMBODIMENTS

Exemplary embodiments of the present invention will hereinafter be described in detail with reference to the accompanying drawings.

Figure 1:
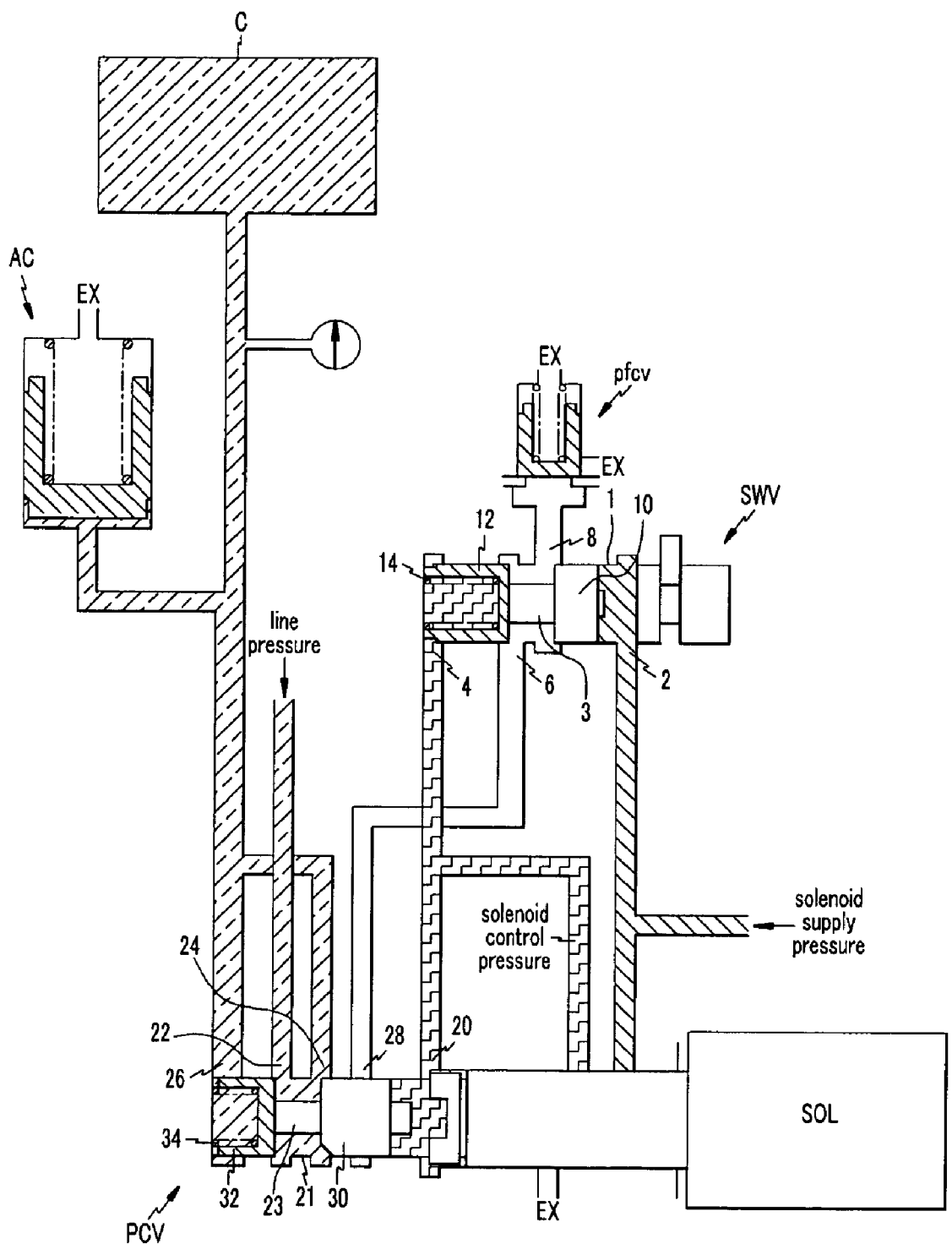
FIG. 1 is a partial schematic view of a hydraulic control system according to a first exemplary embodiment of the present invention and shows flow of hydraulic pressure during shifting.

As shown in FIG. 1, a first exemplary embodiment of the present invention is configured with a solenoid supply pressure simultaneously supplied to a solenoid valve SOL and a switching valve SWV. A control pressure controlled by the solenoid valve SOL is supplied to the switching valve SWV and a pressure control valve PCV as a control pressure thereof.

In addition, the pressure control valve PCV is configured to control a line pressure by being controlled by the control pressure of the solenoid valve SOL and to supply the controlled line pressure to a frictional element C. The PCV is also configured such that an exhaust pressure thereof is exhausted via the switching valve SWV.

Therefore, if a shift signal is generated by a TCU (transmission control unit) (not shown), the solenoid valve SOL controls the solenoid supply pressure and supplies the controlled pressure to the pressure control valve PCV. Then, the pressure control valve PCV is controlled by the supplied control pressure and operates to supply the line pressure to the frictional element C. The TCU may comprise a processor and memory with associated hardware, software and or firmware as may be selected and programmed by a person of ordinary skill in the art based on the teachings contained therein.

For the above-mentioned hydraulic pressure control, a valve body 1 of the switching valve SWV includes a first port 2 through which the solenoid supply pressure is supplied, a second port 4 through which the control pressure of the solenoid valve SOL is supplied, a third port 6 connected to an exhaust hydraulic line of the pressure control valve PCV, and a fourth port 8 selectively communicating with the third port 6 to act as an exhaust port. The fourth port 8 communicates with a pre-fill pressure control valve pfcv, and thereby an exhaust pressure can be stably controlled.

A valve spool 3 installed in the valve body 1 includes a first land 10 on which the hydraulic pressure supplied through the first port 2 acts and a second land 12 selectively opening/closing the fourth port 6 and on which the hydraulic pressure supplied through the second port 4 acts. An elastic member 14 is disposed between the second land 12 and the valve body I and thereby provides an elastic force urging the valve spool 3 in the right direction in the drawing.

Figure 2:
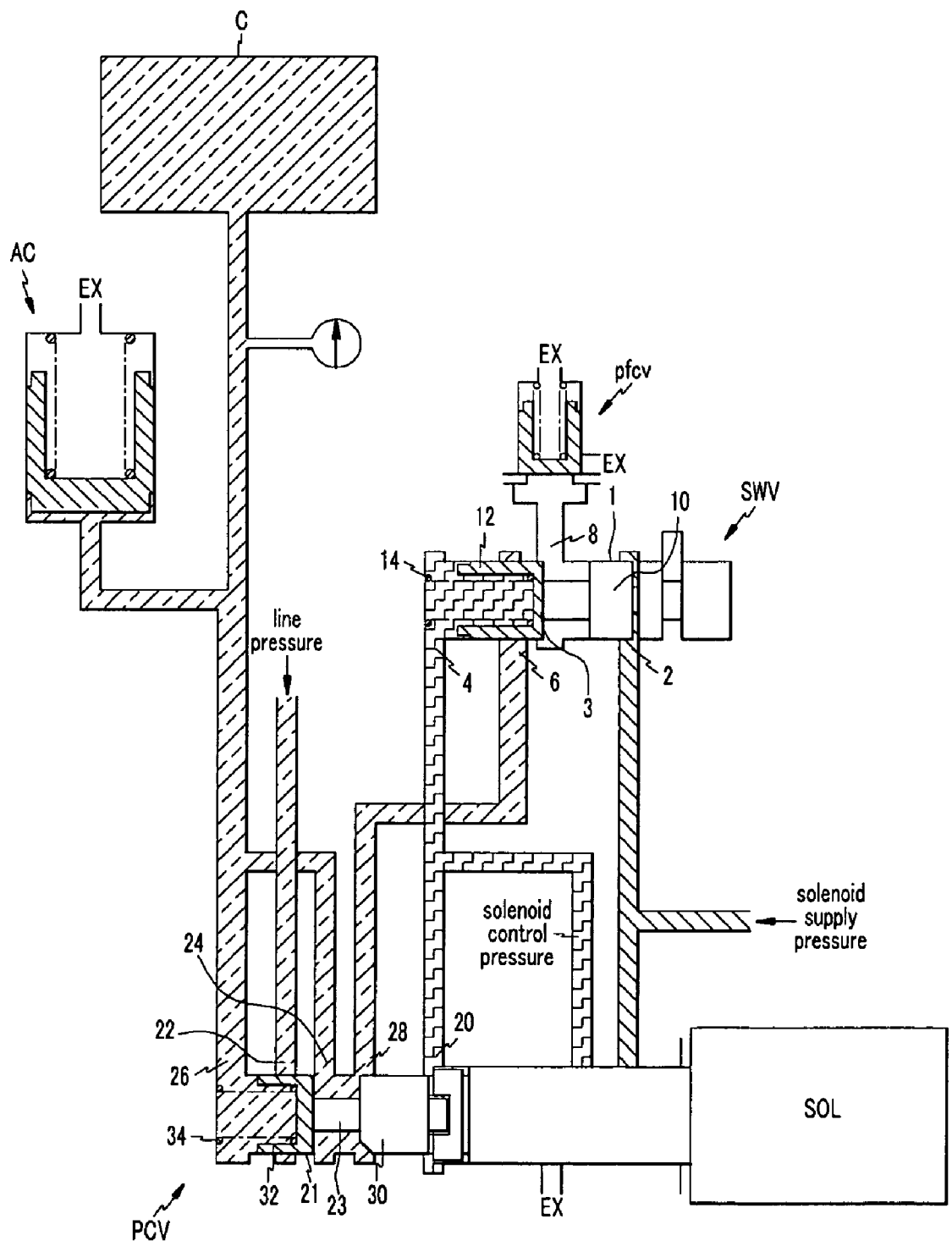
FIG. 2 is a partial schematic view of a hydraulic control system according to the first exemplary embodiment of the present invention and shows flow of hydraulic pressure while a maximum pressure operates.

The switching valve SWV is configured to be switched by conditions of the solenoid supply pressure, the control pressure of the solenoid valve SOL, and the elastic force of the elastic member 14. Thus, while the solenoid supply pressure is being supplied, as shown in FIG. 1, the valve spool 3 is initially maintained to locate at a position moved to the left in the drawing, and if the control pressure of the solenoid valve SOL becomes greater than a specific level, the valve spool 3 moves to the right direction in the drawing thereby closing the third port 6, as shown in FIG. 2.

A valve body 21 of the pressure control valve PCV includes a first port 20 through which the control pressure of the solenoid valve SOL is supplied, a second port 22 through which the line pressure is supplied, a third port 24 supplying the hydraulic pressure supplied through the second port 22 to the frictional element C, a fourth port 26 through which a portion of the hydraulic pressure discharged through the third port 24 is supplied, and a fifth port 28 supplying an exhaust pressure of the third port 24 to the third port 6 of the switching valve SWV.

A valve spool 23 installed within the valve body 21 includes a first land 30 on which the control pressure supplied through the first port 20 acts, and a second land 32 on which the hydraulic pressure supplied through the fourth port 26 acts and which selectively opens/closes the second port 22. An elastic member 34 is disposed between the second land 32 and the valve body 21.

The pressure control valve PCV is configured to be controlled by the control pressure of the solenoid valve SOL, the operating hydraulic pressure of the frictional element C, and the elastic force of the elastic member 34. Thus, if the control pressure is supplied through the first port 20, as shown in FIG. 1, the valve spool 23 moves to the left in the drawing so that the second port 22 and the third port 24 are communicated with each other. Accordingly, the operating hydraulic pressure supplied to the second port 22 is supplied to the frictional element C via the third port 24.

In addition, the hydraulic pressure discharged through the third port 24 is supplied to the fourth port 26, and the supplied hydraulic pressure acts on the valve spool 23. A force generated by the supplied pressure and the elastic force of the elastic member 34 make an equilibrium with a force generated by the control pressure supplied through the first port 20.

In addition, if the operating hydraulic pressure becomes maximum, even when the operating pressure is supplied through the first port 20, the valve spool 23 is, as shown in FIG. 2, moved to the right in the drawing, by a portion of the operating hydraulic pressure supplied through the fourth port 26 and the elastic force of the elastic member 34, thereby closing the second port 22, and the third port 24 and the fifth port 28 are communicated with each other so that a portion of the operating hydraulic pressure supplied to the frictional element C is supplied to the switching valve SWV via the firth port 28.

Since in the switching valve SWV, the control pressure supplied through the second port 4 becomes a maximum pressure, as shown in FIG. 2, the valve spool 3 is urged to move to the right in the drawing by the control pressure and the elastic force of the elastic member 14 thereby closing the third port 6. Accordingly, a hydraulic pressure exhaust is stopped. Therefore, the operating hydraulic pressure of the frictional element C is maintained as the same level as the line pressure.

Since the operating hydraulic pressure of the frictional element C is controlled as above-mentioned, a control range of the solenoid valve SOL for controlling the operating hydraulic pressure of the frictional element C is enlarged when compared to the conventional art, and a precise control is thereby possible. In addition, since a change of the operating hydraulic pressure of the frictional element depending on a deviation of the control pressure of the solenoid valve SOL is relatively small, a precise control is possible.

In addition, in the case that there is a great difference of torque load between shift ratios in a multi-stage transmission such as a six-speed transmission, the control range of the solenoid valve SOL can be designed in response to shifting capacity, and a precise control is thereby possible. In addition, a maximum pressure corresponding to the torque load for each shift ratio can be generated by the pressure control valve PCV and the switching valve SWV, and an oil leak under the maximum pressure can be prevented.

An unexplained reference sign AC of FIG. 1 and FIG. 2 designates an accumulator for stably controlling the hydraulic pressure supplied to the frictional element C.

Figure 3:
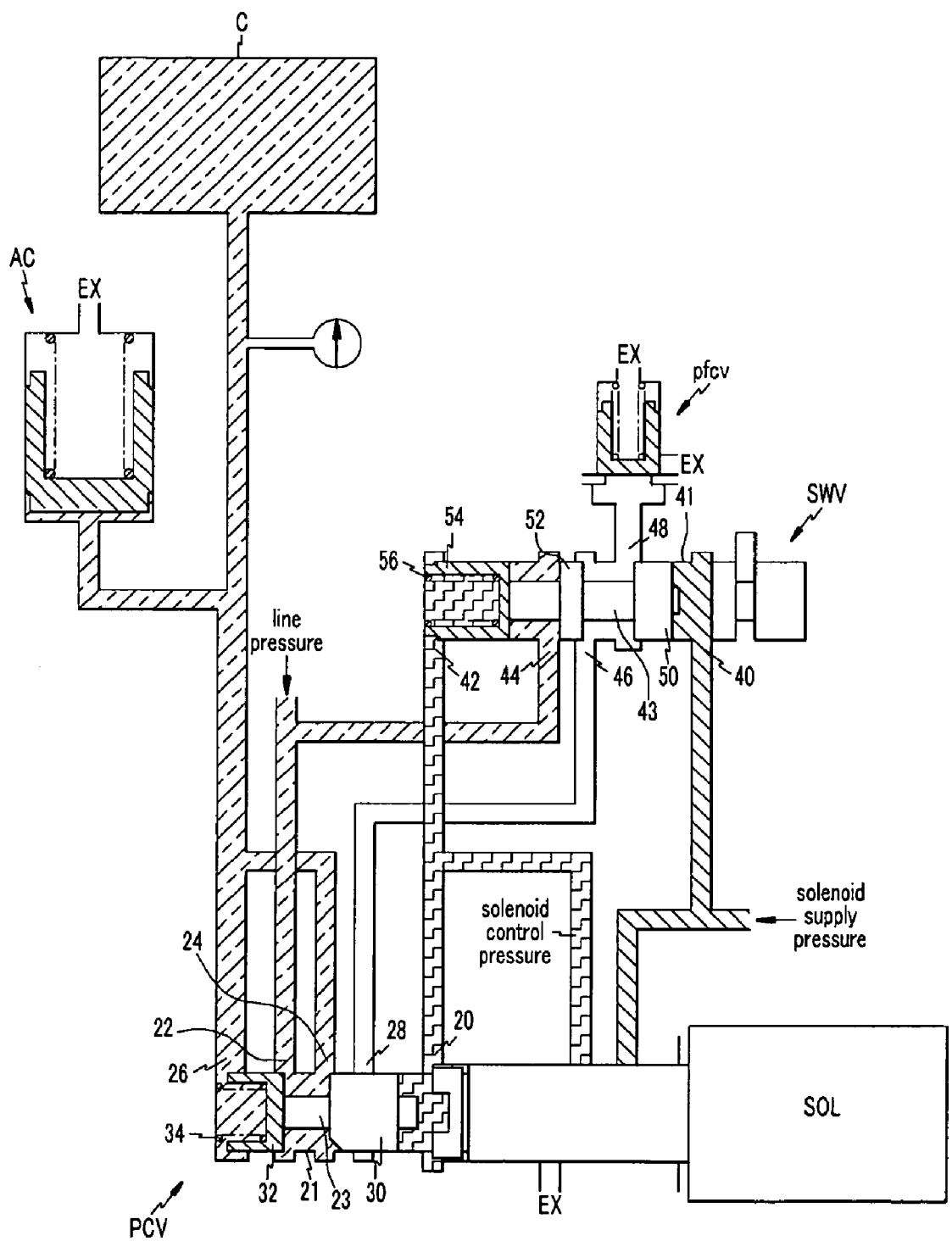
FIG. 3 is a partial schematic view of a hydraulic control system according to a second exemplary embodiment of the present invention and shows flow of hydraulic pressure during shifting.

FIG. 3 shows a second exemplary embodiment of the present invention. In this embodiment, a line pressure is applied to a switching valve SWV, different from the first exemplary embodiment. A valve body 41 of the switching valve SWV includes a first port 40 through which a solenoid supply pressure is supplied, a second port 42 through which the control pressure of the solenoid valve SOL is supplied, a third port 44 through which the line pressure is supplied, a fourth port 46 connected to the exhaust hydraulic line of the pressure control valve PCV, and a fifth port 48 selectively communicating with the fourth port 46 and thereby acting as an exhaust port. The fifth port 48 communicates with the pre-fill pressure control valve pfcv.

A valve spool 43 installed within the valve body 41 includes a fist land 50 on which the hydraulic pressure supplied through the first port 40 acts, a second land 52 selectively opening/closing the fourth port 46 and the fifth port 48, and a third land 54 on which the hydraulic pressure supplied through the second port 42 acts. An elastic member 56 is disposed between the third land 54 and the valve body 41, and provides an elastic force pushing the valve spool 43 to the right in the drawing.

The switching valve SWV is configured to be switched depending on conditions of the solenoid supply pressure and the control pressure of the solenoid valve SOL, and the elastic force of the elastic member 56. Therefore, as shown in FIG. 3, in a state that an automatic transmission has been started, the solenoid supply pressure of the solenoid valve SOL and the line pressure are supplied to the switching valve SWV. At this time, since hydraulic pressure acting areas of the second and third lands 52 and 54 are equal, the line pressure does not actually act on the valve spool 43. Accordingly, the valve spool 43 is moved to the left by the force caused by the solenoid supply pressure, and the valve spool 43 stays at a position maximally moved to the left in the drawing.

Figure 4:
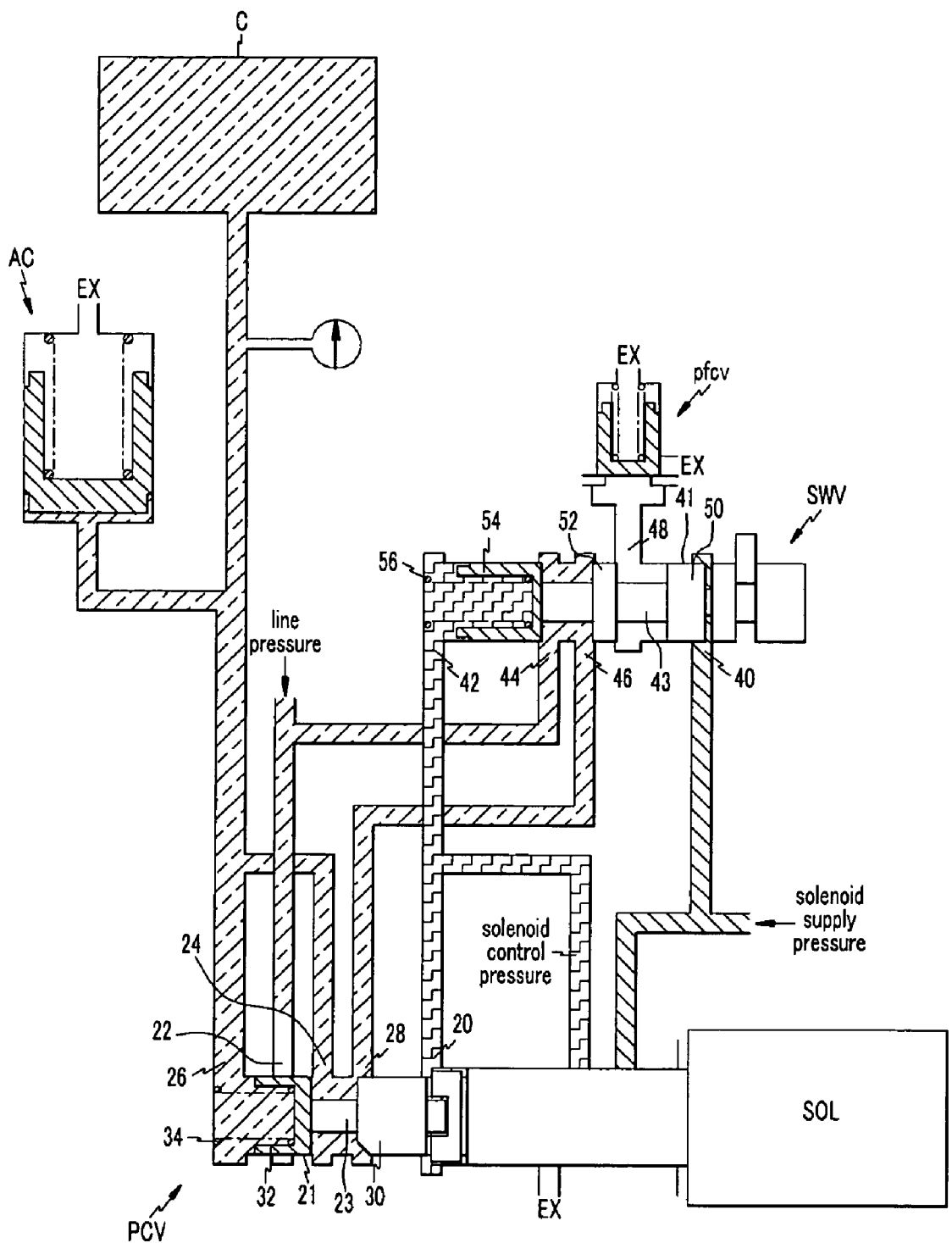
FIG. 4 is a partial schematic view of a hydraulic control system according to the second exemplary embodiment of the present invention and shows flow of hydraulic pressure while a maximum pressure operates.

In this state, if the solenoid valve SOL initiates a control for shifting, the control pressure of the solenoid valve SOL is supplied to the first port 20 of the pressure control valve PCV and to the second port 42 of the switching valve SWV, and thereby a shifting starts. If the control pressure of the solenoid valve SOL becomes higher than a specific level, a force caused by the control pressure and the elastic force of the elastic member 56 overcomes a force caused by the solenoid supply pressure, so that the valve spool 43 moves to the right in the drawing as shown in FIG. 4 and the second land 52 is positioned between the fourth port 46 and the fifth port 48. Thus, the third port 44 and the fourth port 46 are communicated with each other, and so the line pressure and the exhaust pressure join with each other. Accordingly, the operating hydraulic pressure of the frictional element C can be maintained and simultaneously an oil leak can be prevented.

Figure 5:
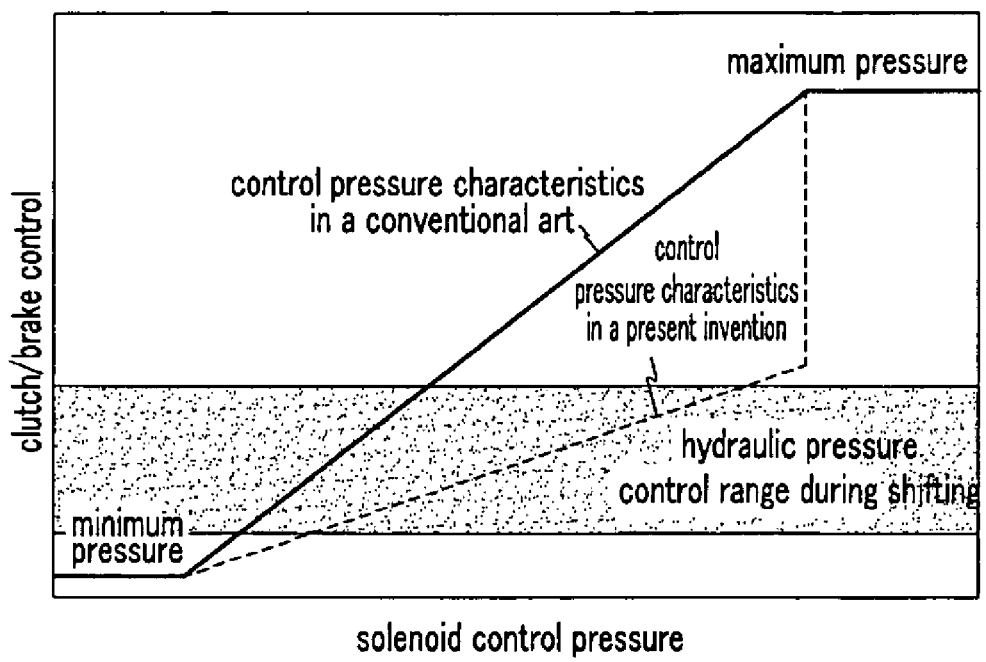
FIG. 5 shows a graph comparatively illustrating control pressure characteristics of a hydraulic control system according to an embodiment of the present invention and a conventional hydraulic pressure control system.

As shown in FIG. 5, since the hydraulic pressure control range during shifting was short in the conventional art, a precise control was difficult. However, since a wide range of the hydraulic pressure control is available during shifting in the present invention, a precise control is possible. In addition, according to the present invention, since a change of the operating hydraulic pressure of the frictional element due to a deviation of the solenoid valve control pressure is small, more precise control is possible.

In addition, according to the present invention, since the control range of the solenoid valve can be designed in response to shifting capacity even in the case that there is a great difference of torque load between shift ratios in a multi-stage transmission, such as a six-speed transmission, a precise hydraulic pressure control is possible, a maximum pressure corresponding to torque load for each shift ratio can be generated by the pressure control valve and the switching valve, and a problem of an oil leak under the maximum pressure can be solved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of an automatic transmission for a vehicle that controls hydraulic pressure generated by a hydraulic pump as operating hydraulic pressure for a frictional element selectively operating at each of a shift ratio and supplies the operating hydraulic pressure, comprising:
    a solenoid valve;
    a pressure control valve controlled by the solenoid valve;
    a switching valve controlled by the solenoid valve;
    a hydraulic line, configured such that the operating hydraulic pressure of the frictional element is controlled by the pressure control valve and the switching valve;
    an exhaust hydraulic line of the pressure control valve; and
    an exhaust hydraulic line of the switching valve connected to the exhaust hydraulic line of the pressure control valve, such that the exhaust hydraulic line of the pressure control valve can be controlled by a switching of the switching valve.

2. The hydraulic control system of claim 1, wherein the exhaust hydraulic line of the pressure control valve is configured to be opened/closed by a switching of the switching valve.

3. The hydraulic control system of claim 1, wherein the exhaust hydraulic line of the pressure control valve is configured to be supplied with a line pressure by a switching of the switching valve.

4. The hydraulic control system of claim 1, wherein the switching valve is configured to be controlled by a solenoid supply pressure and a solenoid control pressure.

5. The hydraulic control system of claim 4, wherein the switching valve is configured to be controlled by the solenoid supply pressure, the solenoid control pressure, and an elastic force of an elastic member.

6. The hydraulic control system of claim 1, wherein the pressure control valve is configured to be controlled by a solenoid control pressure and an operating pressure of the frictional element.

7. The hydraulic control system of claim 6, wherein the pressure control valve is configured to be controlled by the solenoid control pressure, the operating hydraulic pressure of the frictional element, and an elastic force of an elastic member.

8. The hydraulic control system of claim 6, wherein the pressure control valve is configured to be controlled by the solenoid control pressure, the operating hydraulic pressure of the frictional element, and a solenoid supply pressure.

9. The hydraulic control system of claim 8, wherein the pressure control valve is configured to be controlled by the solenoid control pressure, the operating hydraulic pressure of the frictional element, the solenoid supply pressure, and an elastic force of an elastic member.

10. A hydraulic control system of an automatic transmission for a vehicle that controls a hydraulic pressure generated by a hydraulic pump to an operating hydraulic pressure for a frictional element selectively operating at each shift ratio and supplies the operating hydraulic pressure, comprising:
    a pressure control valve controlling a line pressure by being controlled by a solenoid valve and supplying the controlled pressure to the frictional element; and
    a switching valve controlling an exhaust hydraulic line of the pressure control valve by being controlled by the solenoid valve.

11. The hydraulic control system of claim 10, wherein the pressure control valve is formed as a spool valve and is configured to be controlled by a control pressure of the solenoid valve, an operating pressure of the frictional element, and an elastic force of an elastic member.

12. The hydraulic control system of claim 10, wherein the pressure control valve comprises:
    a valve body including a first port through which a control pressure of the solenoid valve is supplied, a second port through which a line pressure is supplied, a third port supplying a hydraulic pressure supplied through the second port to the frictional element, a fourth port supplied with a portion of the hydraulic pressure discharged through the third port, and a fifth port communicating with an exhaust hydraulic line exhausting an exhaust pressure of the third port to the switching valve;
    a valve spool including a first land on which the control pressure supplied through the first port acts, and a second land on which the hydraulic pressure supplied through the fourth port acts and which selectively opens/closes the second port; and
    an elastic member disposed between the second land and the valve body.

13. The hydraulic control system of claim 10, wherein the switching valve is formed as a spool valve and is configured to be controlled by a solenoid supply pressure, a solenoid control pressure, and an elastic force of an elastic member.

14. The hydraulic control system of claim 10, wherein the switching valve comprises:

- a valve body including a first port through which a solenoid supply pressure is supplied, a second port through which a control pressure of the solenoid valve is supplied, a third port connected to an exhaust hydraulic line of the pressure control valve, and a fourth port selectively communicating with the third port to act as an exhaust port;
- a valve spool including a first land on which an hydraulic pressure supplied through the first port acts, and a second land on which a hydraulic pressure supplied through the second port acts and which selectively opens/closes the fourth port; and
- an elastic member disposed between the second land and the valve body.

15. The hydraulic control system of claim 10, wherein the switching valve is formed as a spool valve and is configured to be controlled by a solenoid supply pressure, a solenoid control pressure, an operating hydraulic pressure of the frictional element, and an elastic force of an elastic member.

* * * * *